United States Patent [19]

Bachelard

[11] 3,963,824

[45] June 15, 1976

[54] PROCESS FOR EXTRACTING CHROMIUM FROM CHROMIUM ORES

[75] Inventor: Roland Bachelard, Lyon, France

[73] Assignee: Produits Chimiques Ugine Kuhlmann, Paris, France

[22] Filed: June 10, 1975

[21] Appl. No.: 585,812

Related U.S. Application Data

[63] Continuation of Ser. No. 362,677, May 22, 1973.

[30] Foreign Application Priority Data

June 14, 1972 France .............................. 72.21356

[52] U.S. Cl. ................................ 423/61; 423/593; 423/53
[51] Int. Cl.² ........................................ C01G 37/14
[58] Field of Search ................. 423/53, 58, 61, 593

[56] References Cited

UNITED STATES PATENTS

| 1,255,144 | 2/1918 | Ekeley et al. ........................ 423/58 |
| 1,535,019 | 4/1925 | Dorsey ................................. 423/58 |
| 1,723,536 | 8/1929 | Weise .................................. 423/61 |
| 2,012,061 | 8/1935 | Demont ............................... 423/61 |
| 3,510,256 | 5/1970 | Schafer ............................... 423/61 |

FOREIGN PATENTS OR APPLICATIONS

| 363,423 | 12/1931 | United Kingdom ................. 423/61 |
| 103,696 | 2/1917  | United Kingdom |

OTHER PUBLICATIONS

Beck et al., "A.P.C. Application 292742," Published July 13, 1943.
Beck et al., "A.P.C. Application 393258," Published July 13, 1943.

Primary Examiner—Herbert T. Carter
Attorney, Agent, or Firm—Pennie & Edmonds

[57] ABSTRACT

Process of extracting chromium from a chromium ore or concentrate by oxidation, which comprises suspending the chromium ore or concentrate in a bath of molten salts and introducing an oxygen-containing gas into the suspension in a sufficient amount and for a sufficient amount of time to oxidize chromium therein.

9 Claims, No Drawings

PROCESS FOR EXTRACTING CHROMIUM FROM CHROMIUM ORES

This is a continuation of application Ser. No. 362,677 filed May 22, 1972.

BACKGROUND OF THE INVENTION

I. Field of the Invention

The present invention relates to a process of extracting chromium from chromium ores, more specifically to a process for treating chromium ores with oxygen.

Chromium derivatives have a wide field of application, especially in the manufacture of pigments, tanning of hides, as surface coatings, in oxidation reactions in the chemical industry and in metallurgical industries.

II. Description of the Prior Art

Chromium occurs with a valence of three in its naturally occurring ores. The commonest of these ores is chromite, a natural oxide of iron and chromium, which in some cases contains oxides of magnesium, aluminum and silicon. Chromium is generally extracted from its ores by oxidation in the form of chromate, in which state its valence is six. The product of this reaction is then treated to extract the chromate. The chromate in solution is acidified with sulfuric acid to form the bichromate, an intermediate product commonly used in the preparation of the various chromium derivatives.

In the present state of the art, the commonly used process for oxidation of chromium ores is known as oxidizing alkaline roasting.

Many variations have been proposed to the roasting operation which is the essential step in the oxidizing alkaline roasting process. Ordinarily, the oxidizing reaction is carried on in a rotary furnace in the presence of sodium carbonate and calcium carbonate, or dolomite, the function of which is to neutralize the acid oxides, which are always present in the ore, and thus to impede their going into solution during the extraction step which follows. To achieve high oxidation yields compatible with an acceptable treatment cycle, the mass of reagents must be brought to a temperature above 1000°C. At this temperature, the sodium chromate and carbonate have passed their melting points. The result is the appearance of a molten phase forming a sticky, pasty mass in the furnace, which by its very nature causes many operating difficulties. Despite the remedies proposed, it has not been possible hitherto to keep this pasty mass from sticking to the walls of the furnace. In addition, the oxidation reaction is slowed down due to difficulty encountered by the oxygen in penetrating the paste. In order to mitigate these adverse effects an inert solid mass is usually added to the reaction mixture, which acts as a diluent for the molten phase. The residues from the aqueous extraction step after roasting are often recycled for this purpose. While this recycling has a favorable effect, it entails a burdensome increase in the aggregate bulk of equipment and lowers the overall heat efficiency of the furnace.

In another proposed modification, to overcome some of the disadvantages noted above, agglomeration by briquetting the raw materials before roasting has been suggested.

All these modified roasting processes intrinsically involve many disadvantages, such as high operating temperature, the need for recycling, and the resultant wasted space in the rotary furnace. Consequently, it would be especially desirable to have a simpler means of oxidative smelting of chromium ores.

It is well known, to those skilled in the art, that chromium ores may be oxidized in a bath of molten $Cr_2O_3$ with sodium peroxide, but this process is not commercially feasible due to its high cost, unlike the process of this invention.

SUMMARY OF THE INVENTION

This invention relates to a process of extracting chromium from a finely divided chromium ore or concentrate which has been sufficiently crushed or ground via a suitable means well known to those skilled in the art, by maintaining a suspension of the fine ore particles in a bath of molten salts into which an oxygen-containing gas is introduced. This process has the advantage of avoiding the drawbacks of the various oxidizing alkaline roasting processes previously described.

The ore which is to be oxidized by this process is advantageously first crushed by any suitable means so that the resultant particles have a mean size of less than about 250 microns.

The salts which are used to prepare the molten bath may have any composition, which does not hinder or impede the oxidation reaction. For example, one may use the chromate, the carbonate or the sulfate salts among others. The salts of sodium are, however, most advantageous. One salt or a mixture of several different salts may be utilized. In one especially advantageous embodiment of the current invention, use is made, of a eutectic mixture to prepare the molten bath. For example, the sodium chromate-sodium carbonate eutectic mixture melting at 670°C. or the potassium chromate - potassium bichromate eutectic mixture melting at 393°C. can be advantageously employed. The molten bath may contain diluents, such as sodium sulfate. Such diluents may serve in some cases to lower the melting point of the bath. The lower limit of temperature at which molten salt baths may be used is of course the melting point of the bath mixture. The upper limit is not critical; one may work at temperatures from 800° to 900°C., but much lower temperatures may be employed by choosing a bath consisting of a suitable eutectic mixture, to obvious economic advantage.

The gas used for the oxidation reaction of this invention may be oxygen or any other gas or mixture of gases containing oxygen so long as the gas in admixture with oxygen does not adversely interfere with the intended oxidation reaction. For example air may be used directly. This gas may be introduced in any suitable manner into the bath of molten salts in which the finely divided ore has been suspended, for example by bubbling or agitating the mixture by introducing the gas at the surface.

The chromium ore in the divided state is held in suspension in the molten bath by the agitation caused by the bubbling of the gas, supplemented if desired by other suitable mechanical agitation means. The ratio between the quantities of molten salt and of chromium ore treated may vary within wide limits. All that is required is that one use enough salt to permit a good ore suspension. Good results have been obtained with a ratio of 1 part of ore to 5 to 20 parts of salt by weight.

The molten salt bath may further contain additives to precipitate impurities that may be present in the ore. For example lime may be used to precipitate the silica and/or alumina which is present in some chromium ores, particularly in chromite ores.

The bath may also contain an oxidation catalyst such as iron oxide or manganese oxide. The addition of an oxidation catalyst is especially advantageous when the process of the present invention is to be carried out at low temperatures. For example at 700°C. using the $Na_2CrO_4$—$Na_2CO_3$ eutectic, it may be helpful to use a catalyst to increase the speed of the reaction.

The later phases of treatment may be carried out by known and conventional processes. The chromate formed by oxidizing action on the chromium ore may, depending on the salt used, be recovered by immersion of the reaction product in $H_2O$. It should be noted, however, that in the practice of the process of this invention it is especially advantageous to use a bath consisting of sodium chromate. Since in this system the chromium from the ore passes into the form of the chromate in the sodium bath, and after decanting off the supernatant liquid from the solid residue, consisting essentially of alumina, magnesia and iron oxide, the sodium chromate in the bath may be crystallized by simply cooling the bath.

The process of the present invention may of course be carried out continuously or in a batch type processing operation.

The advantages of this new process over oxidative roasting are many. They include lower operating temperature, elimination of mechanical preparation of the charge, elimination of recycling, improved heating efficiency and reduced size of the equipment which must be utilized. In the design of the particular equipment to be employed in a given processing operation careful consideration to the reduction of dead space in the equipment and reduction of losses of ore fines due to entrainment in the gases being passed through the reaction mixture will greatly improve the over-all efficiency of the operation.

DESCRIPTION OF THE PREFERRED EMBODIMENTS

Examples 1 to 5 below will serve to illustrate the preferred embodiments of the process of the present invention.

In all of these examples the parts are parts by weight. The ore used is a chromite having the following composition:

| | |
|---|---|
| $Cr_2O_3$ | 15.2% |
| FeO | 11.45 |
| MgO | 18.05% |
| $Al_2O_3$ | 8.03 |
| $SiO_2$ | 5.72 |

This chromite ore was crushed, and only the fraction passing through a screen having an opening of 74 microns between strands was used.

EXAMPLE 1

20 parts of crystalline sodium carbonate were placed in a reactor. The temperature of this sodium carbonate was raised gradually and maintained at 900°C. in an electric furnace. One part of chromite ore was introduced into the heated carbonate bath. The ore was kept in suspension by mechanical agitation. A flow of air equivalent to 2.87 parts of oxygen per hour was introduced via the hollow shaft of the agitator at the bottom of the reactor. These conditions were maintained for 2 hours. At the end of the treatment cycle, the mixture was cooled, then immersed in water, dissolving the sodium chromate. The residue was separated by filtration. Analysis of the soluble chromium showed that 96.3% of the chromium in the ore went to valence six in the form of sodium chromate.

EXAMPLE 2

A molten salt bath was prepared of 100 parts of a eutectic sodium chromate - sodium carbonate mixture melting at 670°C. having the following composition:

| | |
|---|---|
| $Na_2CO_3$ | 37.5% |
| $Na_2CrO_4$ | 62.5% |

This bath was heated, to a temperature of 900°C., and 10 parts of chromite ore were then added. Oxidation was induced by injection of air at the rate of 65 parts per hour into the bath in the form of fine bubbles. This treatment was continued for 4 hours. The resultant phases were then separated by water extraction and filtration. The sodium chromate formed a rich solution whose constituents were recoverable by conventional fractional crystallization. The rate of extraction of chromium was to 97.4%.

EXAMPLE 3

100 parts of a solid mixture of sodium chromate and sodium carbonate in the proportions indicated in Example 2, forming a eutectic melting at 670°C., were placed in a reactor.

20 parts of chromite ore were added, and the mixture was heated in an electric furnace. When the temperature reached 900°C., mechanical agitation was applied, and air was blown into the suspension in the form of fine bubbles at an hourly mass flow rate representing 3.25 times the weight of ore to be oxidized. This treatment was applied for 2 hours. At the end of this time, the flow of air and heating were discontinued and the reactor was dumped into a cooled metal tank where the molten phase solidified. The mass was leached with $H_2O$ and the aqueous phase containing the sodium chromate and excess carbonate was separated by filtration.

78% of the chromium in the ore was recovered in the aqueous phase.

EXAMPLE 4

20 parts of the sodium chromate-carbonate eutectic mixture defined in Example 2 were placed into a reactor. The temperature of the bath was brought to 800°C. by means of an electric furnace, and one part of the chromite ore was suspended therein. Over a 2-hour period, a quantity of air equal to 26 times the weight of ore to be treated was introduced into this suspension, which was constantly agitated by mechanical means. The resultant phases were then separated in the same manner as in the above examples. An analysis for Cr in the solid residue showed that there was a 42% conversion of the chromium in the ore.

EXAMPLE 5

100 parts of pure sodium chromate were placed in a reactor. The sodium chromate was fused in an electric furnace, and the temperature was brought to 900°C. 16 parts of chromite ore and the stoichiometric quantity of sodium carbonate required to neutralize the acid oxides of the ore and the chromium oxide were introduced.

After attaching a mechanical agitator, air was injected into the suspension by a diffuser, which was capable of dispersing the gas in small size bubbles. The hourly mass flow rate of oxygen admitted was 1.3 times the total quantity of chromite to be oxidized. The reaction was allowed to continue for 2 hours, then, while maintaining the heat, the solid residue was allowed to settle and was separated. Upon cooling, the molten phase deposited crystals of pure sodium chromate.

The solid phase, impregnated with molten phase, was treated with water to extract the solid sodium salts.

Chromium analysis of the solid residue showed that the extraction of chromium from the ore was 70.6%.

I claim:

1. A process for extracting chromium in the form of a chromate from ore or concentrate by the suspension oxidation thereof to the chromate state which comprises suspending finely crushed ore or concentrate containing the chromium in a molten liquid bed of an alkali metal salt in the ratio of 1 part by weight of ore to 5 to 20 parts by weight of salt; subjecting the suspension to agitation with an oxygen-containing gas at a temperature and for a time sufficient to convert the chromium to alkali metal chromates; and leaching with water to separate out the water soluble chromates from insoluble residue.

2. The process of claim 1 wherein the chromium is in the form of an ore having a mean size of less than 250 microns.

3. The process of claim 1 in which the alkali metal salt forming the molten liquid bed is selected from sodium carbonate, sodium chromate, potassium carbonate, potassium chromate, sodium sulfate, potassium sulfate, potassium bichromate, or mixtures thereof.

4. The process of claim 3 in which the alkali metal salt forming the molten liquid bed is sodium carbonate.

5. The process of claim 3 in which the oxygen-carrying gas is introduced at the surface of the molten liquid bed.

6. The process of claim 3 wherein the mixtures of alkali metal salts forming the molten liquid bed is selected from eutectic mixtures of sodium chromate and sodium carbonate, or potassium chromate and potassium bichromate.

7. The process of claim 1 wherein the molten liquid bed contains sodium sulfate as a diluent.

8. The process of claim 1 wherein the molten liquid bed contains a sufficient quantity of an oxidation catalyst to increase the rate of the oxidation reaction.

9. The process of claim 8 wherein the oxidation catalyst is iron oxide, manganese oxide, or a mixture thereof.

* * * * *